United States Patent [19]

Bode

[11] Patent Number: 4,968,155

[45] Date of Patent: Nov. 6, 1990

[54] ROLLING-BEARING-MOUNTED LINEAR GUIDING UNIT AND DAMPING ELEMENT

[75] Inventor: Helmut Bode, Herzogenaurach, Fed. Rep. of Germany

[73] Assignee: INA Walzlager Schaeffler KG, Fed. Rep. of Germany

[21] Appl. No.: 469,329

[22] Filed: Jan. 24, 1990

[30] Foreign Application Priority Data

Apr. 1, 1989 [DE] Fed. Rep. of Germany ... 8903980[U]

[51] Int. Cl.[5] ............................................. F16C 29/06
[52] U.S. Cl. ........................................ 384/45; 384/7; 384/25
[58] Field of Search ..................... 384/7, 8, 12, 13, 25, 384/43–45

[56] References Cited

U.S. PATENT DOCUMENTS

| 4,376,556 | 3/1983 | Bergman et al. | 384/44 |
| 4,529,255 | 7/1985 | Piotrowski | 384/7 |
| 4,662,762 | 5/1987 | Schwarz | 384/25 |
| 4,773,770 | 9/1988 | Osawa | 384/45 |

Primary Examiner—Thomas R. Hannon
Attorney, Agent, or Firm—Bierman and Muserlian

[57] ABSTRACT

A rolling-bearing-mounted linear guiding unit comprising a hardened and polished guide rail on which rolling element raceways are formed and a guide carriage longitudinally displaceably mounted on the guide rail and provided with a fixing surface turned away from the guide rail and an inner contour adapted in shape to the profile of the guide rail, rolling elements rolling in endless race canals between the rolling element raceways of the guide rail and surfaces situated opposite to these in the guide carriage and a damping element bveing provided next to the guide carriage and a damping element being provided next to the guide carriage and forming a damping gap with the guide rail, characterized in that the damping element is formed as a saddle engaging around the guide rail, which saddle in respect of the guide rail, has a fixing surface identical to that of the guide carriage, the inner contour of the saddle being adapted for the most part to the profile of the guide rail so that these delimit a damping gap of 0 to 40 $\mu$m.

4 Claims, 3 Drawing Sheets

ROLLING-BEARING-MOUNTED LINEAR GUIDING UNIT AND DAMPING ELEMENT

STATE OF THE ART

Rolling-bearing-mounted linear guiding units comprising a hardened and polished guide rail on which rolling element raceways are formed and a guide carriage longitudinally displaceably mounted on the guide rail and provided with a fixing surface turned away from the guide rail and an inner contour adapted in shape to the profile of the guide rail, rolling elements rolling in endless race canals between the rolling element raceways of the guide rail and surfaces situated opposite to these in the guide carriage and a damping element being provided next to the guide carriage and forming a damping gap with the guide rail are known. Because of their considerably lower displacement resistance, it is desirable to increasedly employ such linear guiding units in the place of sliding guides for the mounting of machine platens on machine tools. Such efforts, however, are opposed by the insufficient damping properties of this type of rolling-bearing-mounted linear guiding units as compared with sliding guides.

The results of this is, that particularly when on machine platens mounted in this manner, work pieces are machined by chip removal, mechanical vibrations occur which lead to unclean or wavy surfaces of the work piece. To remedy this, a damping element in the form of a strip arranged next to the guide carriage has already been employed which, to prevent a sliding bearing effect together with the guide rail delimits a defined damping gap filled with oil. By this measure, a considerable improvement of the damping behavior in the vertical direction was indeed achieved, but this is still not satisfactory because vibrations, both horizontal as well as inclined to the direction of movement still have a disturbing effect.

OBJECTS OF THE INVENTION

It is an object of the invention to achieve an all-round damping with simple means and thus eliminate the disadvantages described.

This and other objects and advantages of the invention will become obvious from the following detailed description.

THE INVENTION

The rolling-bearing mounted linear guide unit of the invention comprising a hardened and polished guide rail on which rolling element raceways are formed and a guide carriage longitudinally displaceably mounted on the guide rail and provided with a fixing surface turned away from the guide rail and an inner contour adapted in shape to the profile of the guide rail, rolling elements rolling in endless race canals between the rolling element raceways of the guide rail and surfaces situated opposite to these in the guide carriage and a damping element being provided next to the guide carriage and forming a damping gap with the guide rail, is characterized in that the damping element is formed as a saddle engaging around the guide rail, which saddle in respect of the guide rail, has a fixing surface identical to that of the guide carriage, the inner contour of the saddle being adapted for the most part to the profile of the guide rail so that these delimit a damping gap of 0 to 40 $\mu$m.

By the proposed design, almost the entire rail profile is utilized for damping whereby perfect vibration damping can be achieved in every direction. The length of the saddle can be easily adapted to the given requirements. A further advantage is gained by the extremely simple assembly since the saddle is mounted exactly in the same manner as the guide carriage so that a special adjustment of the damping gap is not necessary.

An advantageous development of the invention provides that the inner contour of the saddle, adapted to the profile of the guide rail, is coated with a plastic material. By the proposed coating of the inner contour of the saddle, an exactly defined damping gap can be achieved with an appropriately designed rail. A further development of the invention consists in that the saddle is provided with bores which open on one side into the damping gap and on the other are directly or indirectly connected with a lubricating oil duct. By this, it is guaranteed that the damping gap is always filled with oil, pulsed lubrication being sufficient as a rule since leakage losses are extremely small.

Referring now to the drawings.

Figure 1:
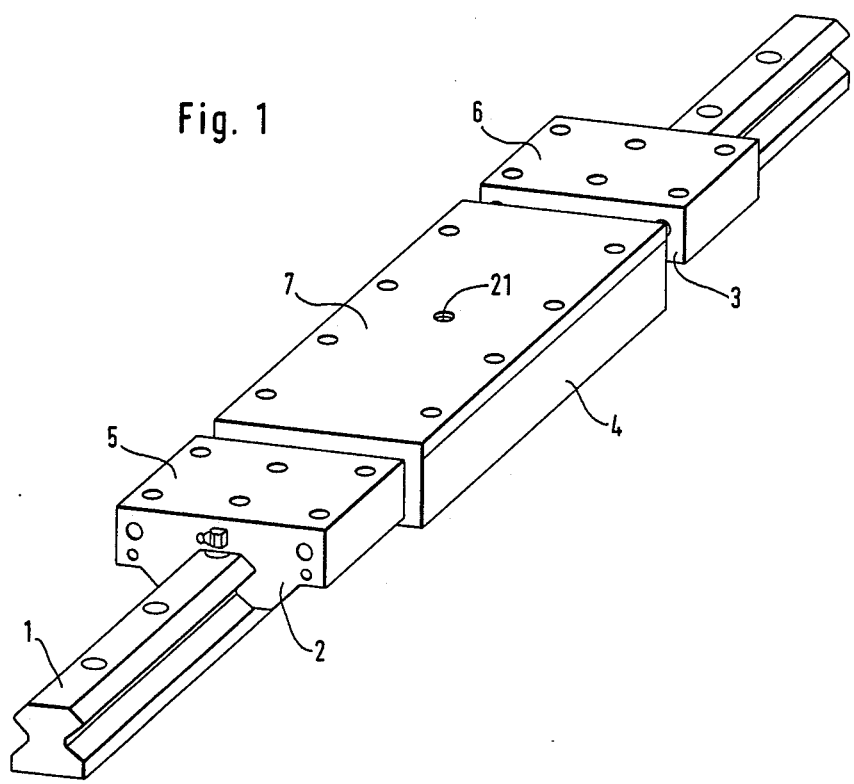
FIG. 1 is a schematic representation of a linear guiding unit of the invention.

The rolling-bearing-mounted linear guiding unit schematically shown in FIG. 1 comprises the hardened and polished guide rail 1, the guide carriages 2 and 3 longitudinally displaceably mounted on this and the damping element in the form of a saddle 4 arranged between the guide carriages 2 and 3. Each of the guide carriages 2 and 3 has a fixing surface 5 and 6 respectively turned away from the guide rail. The saddle 4 likewise has a fixing surface 7 which, in respect of the guide rail 1, is identical to that of the guide carriage 2 or 3.

Figure 2:
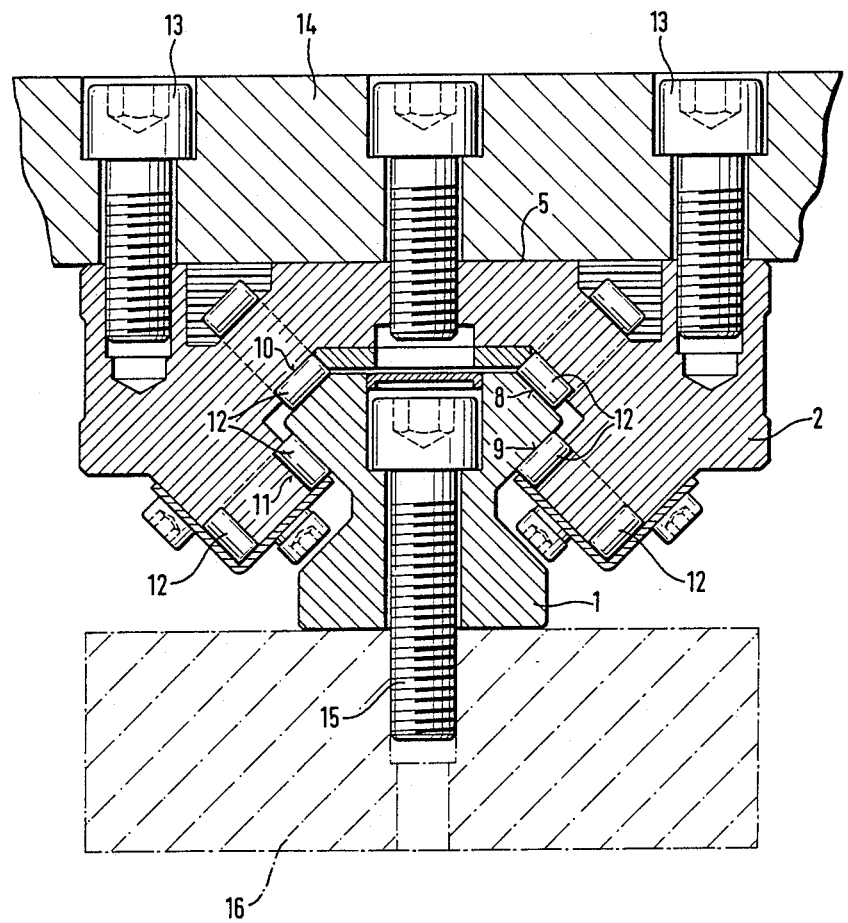
FIG. 2 is a cross-section through a guide carriage of FIG. 1.

As shown in FIG. 2, rolling element raceways 8 and 9 are formed on the guide rail 1 and each of the guide carriages 2 and 3 has an inner contour adapted to the profile of the guide rail 1. Rolling elements 12 roll in endless, in themselves, known race canals between the rolling element raceways 8 and 9 and surfaces 10 and 11 situated opposite to these in each of the guide carriages 2 and 3. The guide carriages 2 and 3 are fixed by their fixing surfaces 5 and 6 to a roughly indicated machine platen 14 by screws 13, whereas the guide rail 1 is rigidly connected to the likewise roughly indicated machine frame 16 by means of screws 15.

Figure 3:
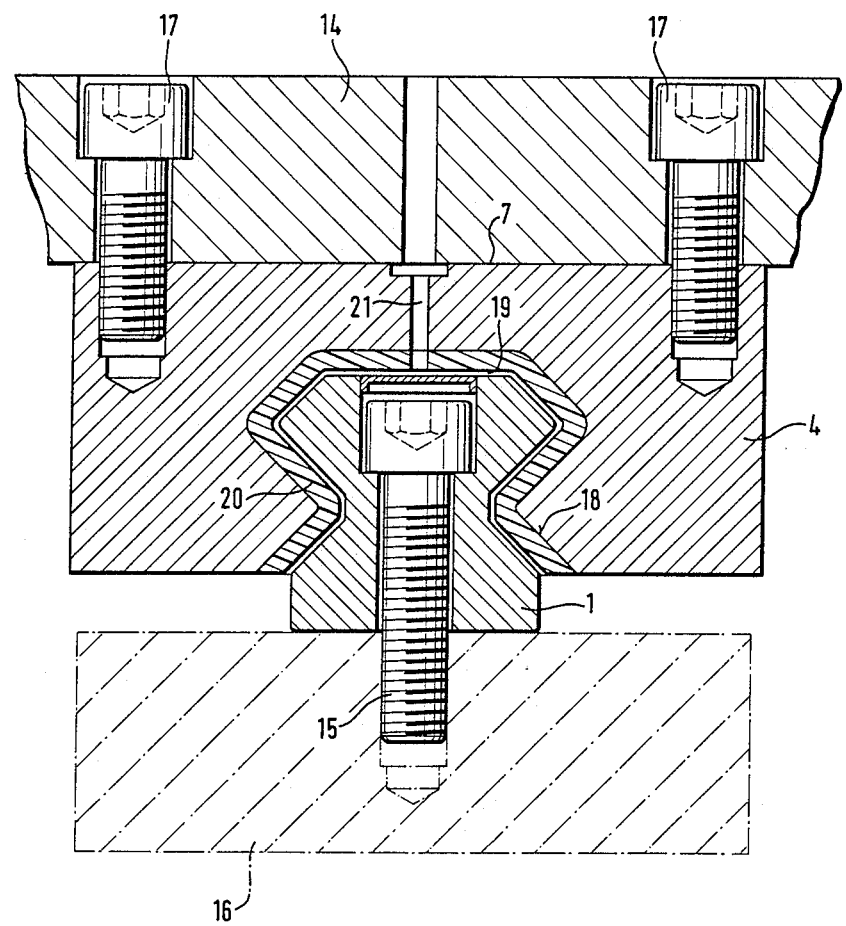
FIG. 3 is a cross-section through the damping element designed as a saddle.

According to the section view shown in FIG. 3, the damping element arranged between the guide carriages 2 and 3 is shaped as a saddle 4 engaging around the guide rail 1 and fixed in the same manner as the guide carriages 2 and 3 to the machine platen 14 by screws 17. The inner contour 18 of the saddle 4 is adapted for the most part to the profile of the guide rail 1 in such a way that these delimit a damping gap 19 of 0 to 40 $\mu$m. The inner contour 18 of the saddle 4, adapted to the profile of the guide rail 1, is coated with a plastics material 20.

A method of making the plastic layer 20 is to insert a rail into the saddle 4, the contour of the cross-section of which rail is larger than that of the rail 1 used later, by the dimension of the desired damping gap. The hollow space remaining between the saddle 4 and the inserted rail is then filled with the plastics material by casting or injection and the rail is removed after cooling and hardening of the plastic material. For the supply of oil to the damping gap 19, the saddle 4 is provided with bores 21 which open on one side into the damping gap 19 and on the other are directly or indirectly connected with a lubricating oil duct, not shown.

Various modifications of the linear guiding unit of the invention may be made without departing from the spirit or scope thereof and it is to be understood that the invention is intended to be limited only as defined in the appended claims.

What is claimed is:

1. A rolling-bearing-mounted linear guiding unit comprising a hardened and polished guide rail on which rolling element raceways are formed, further comprising a guide carriage longitudinally displaceably mounted on the guide rail, which carriage is provided with a fixing surface turned away from the guide rail as well as with an inner contour adapted in shape to the profile of the guide rail, wherein rolling elements roll in endless race canals between the rolling element raceways of the guide rail and surfaces situated opposite to these in the guide carriage, and wherein a damping element is provided next to the guide carriage to form a damping gap with the guide rail, characterized in that the damping element is formed as a saddle engaging around the guide rail, which saddle in respect to the guide rail, has a fixing surface identical to that of the guide carriage, the inner contour of the saddle corresponding essentially to the profile of the guide rail to delimit together with this a damping gap of 0 to 40 $\mu$m.

2. A rolling-bearing-mounted linear guiding unit of claim 1 wherein the inner contour of the saddle corresponding to the profile of the guide rail, is coated with a plastic material.

3. A rolling-bearing-mounted linear guiding unit of claim 2 wherein the saddle is provided with bores which open on one side into the damping gap and on the other are directly or indirectly connected with a lubricating oil duct.

4. A rolling-bearing-mounted linear guiding unit of claim 1 wherein the saddle is provided with bores which open on one side into the damping gap and on the other are directly or indirectly connected with a lubricating oil duct.

* * * * *